United States Patent [19]

Egger

[11] Patent Number: 4,926,971

[45] Date of Patent: May 22, 1990

[54] ARRANGEMENT FOR LUBRICATING THE CHAIN GUIDE IN A DRAG CHAIN CONVEYOR FOR LOOSE ARTICLES

[75] Inventor: Walter C. Egger, Zurich, Switzerland

[73] Assignee: VT-Verpackungstechnik Zurich, Zurich, Switzerland

[21] Appl. No.: 607,249

[22] Filed: May 4, 1984

[30] Foreign Application Priority Data

May 4, 1983 [CH] Switzerland ............ 2421/83

[51] Int. Cl.$^5$ ............ B65G 45/02
[52] U.S. Cl. ............ 184/15.1; 198/500
[58] Field of Search ............ 184/15.1, 15.2, 15.3; 198/500, 501, 345, 837, 841, 817, 851

[56] References Cited

U.S. PATENT DOCUMENTS

| | | | |
|---|---|---|---|
| 2,304,571 | 12/1942 | Joa | 184/15.1 |
| 2,541,301 | 2/1951 | Sissler | 198/500 X |
| 3,275,102 | 9/1966 | Holzinger et al. | 184/15.1 X |
| 3,308,921 | 3/1967 | Bower | 198/345 |
| 3,379,298 | 4/1968 | Willis | 198/345 |
| 3,491,543 | 1/1970 | Field | 184/15.1 X |
| 3,543,882 | 12/1970 | Paasche | 184/15.2 |
| 3,550,758 | 12/1970 | Stalker | 198/501 |
| 3,586,153 | 6/1971 | Rainbow | 198/841 X |

FOREIGN PATENT DOCUMENTS 25676 3/1981 European Pat. Off. ............ 198/841

Primary Examiner—Leonard E. Smith
Attorney, Agent, or Firm—Ladas & Parry

[57] ABSTRACT

The drag chain conveyor has carriers (5) which cooperate with the conveyed articles and are joined to an endless conveyor chain, and which slide on guide rails (4). For the lubrication of this chain guide, each guide rail (4) has at least one lubrication point. At this point is provided a channel (8) which extends in the guide rail transversely to the guide track and which is connected to a lubricant supply pipe (9). A plurality of bores (10) starting from this channel (8) carry the lubricant to the surface of the rail in the sliding region. This lubrication arrangement permits higher conveying speeds and ensures a longer life of the conveyor chains.

5 Claims, 2 Drawing Sheets

ARRANGEMENT FOR LUBRICATING THE CHAIN GUIDE IN A DRAG CHAIN CONVEYOR FOR LOOSE ARTICLES

The invention relates to an arrangement for lubricating the chain guide in a drag chain conveyor for loose articles, in which the carriers cooperating with the conveyed articles and joined to an endless chain slide on guide rails.

For the conveying of loose articles, for example bottles, in various fields of application, e.g. in the field of bottle-washing machines, drag chain conveyors are used which comprise two conveyor chains which are spaced apart and run in the same direction and on which are disposed oppositely directed carriers bounding a conveying channel and having in particular resilient grippers.

There are applications for drag chain conveyors where hitherto lubrication of the chain guide has been dispensed with in order to avoid the danger of contact between the lubricant and the articles being conveyed. Particularly in the foodstuffs industry and associated fields, legal regulations require special precautions in this respect. Nevertheless, operation of a drag chain conveyor without lubrication, particularly with high conveying speeds, leads to premature wear of the conveyor chains. The only possible remedy consists in slightly reducing the extent of this shortcoming by using guides which are as frictionless as possible.

So-called water lubrication is moreover customary, being used, or occurring as a side effect, in particular where water is utilised for treating the articles conveyed, for example in bottle-washing machines. However, the lubricating action of water is generally insufficient.

In most cases, moreover, there is no controlled supply of water to the chain guides. Disturbance-free operation of the drag chain conveyor is therefore not ensured in this manner.

The problem underlying the invention therefore consists in providing, for a drag chain conveyor of the type first defined above, an arrangement for lubricating the chain guide which will be generally applicable and enable higher conveying speeds and a longer life of the conveyor chains to be achieved.

This problem is solved in that according to the invention each guide rail has at least one lubrication point at which there is provided a channel which extends in the guide rail transversely to the guide track and is connected to a lubricant supply pipe, and from which extend a plurality of bores carrying the lubricant to the surface of the rail in the sliding region.

The lubricant used is expediently an oil, which takes into account the nature of the articles conveyed for example when the drag chain conveyor is used in the foodstuffs industry, a physiologically unobjectionable oil can be used.

As a rule, a single lubrication point on each guide rail is sufficient to maintain a sufficiently thick film of oil along the entire guide track. In the case of very long conveyor paths it may however be expedient to provide a plurality of lubrication points on each guide rail.

Since the guide rails are uncovered between the various successive carriers, it is advantageous for the lubricant to flow out of the bores under practically zero pressure difference over the ambient pressure. To this end a suitably adjusted pressure-reducing valve can be provided in the lubricant supply pipe for each lubrication point.

In certain circumstances it may be expedient to regulate the supply of lubricant in dependence on the loading of the conveyor chains. In this case the pressure-reducing valve provided may be a metering valve for the intermittent supply of lubricant, this valve being controlled by a load-dependent variable.

The arrangement according to the invention can in addition contain automatically operating control means which continuously monitor the supply of lubricant, particularly the reservoir level, the pressure, and the correct flow of the lubricant, and, for example in the case of a failure, trigger a signal giving a warning and, if the warning is not heeded, causing the drag chain conveyor to stop after a given waiting time.

One embodiment of the invention is illustrated diagrammatically in the drawing, in which.

Figure 1:
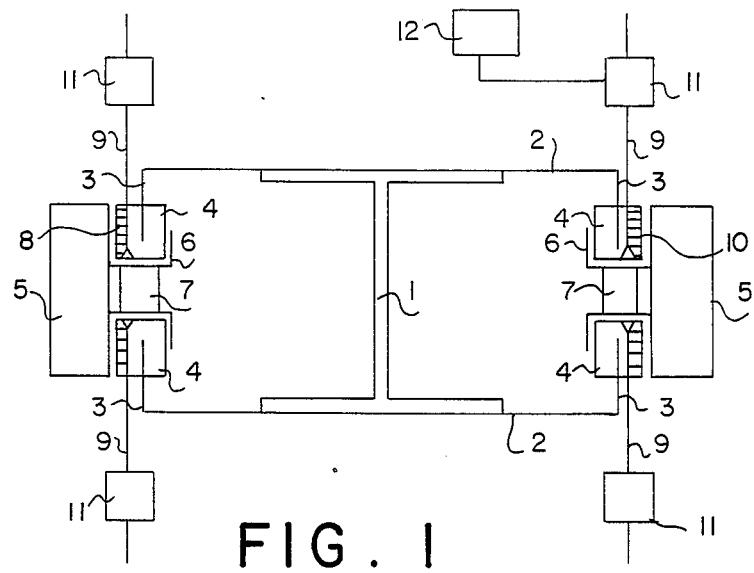
FIG. 1 is a cross-section of the chain guide in a drag chain conveyor.

According to FIG. 1, the chain guide comprises a chain track profile consisting of a double T-girder 1 and two plates 2 having arms 3 bent over at right angles. On the arms 3, which face one another on both sides, of the two plates 2 are mounted guide rails 4, a pair of which forms a guide track. On the guide rails 4 slide the carriers 5, which are provided with a holder 6 partly surrounding the two guide rails of a guide track and joined to a link 7 of an endless conveyor chain. A control means 12 is provided to automatically monitor the supply of lubricant. The control means will monitor the reservoir level, the pressure, and the correct flow of the lubricant. Moreover, in case of a failure, the control means will trigger a signal to provide a warning and stop the drag chain conveyor after a given time period.

The drag chain conveyor has two chain guides or shown in FIG. 1, these being disposed side by side in such a manner that the carriers 5, extending in opposite directions in the space therebetween, bound a conveying channel and cooperate with the articles conveyed in such channel. On the opposite side of each chain guide, that is to say on the outer sides of the arrangement, the conveyor chain makes its return movement.

Figure 2:
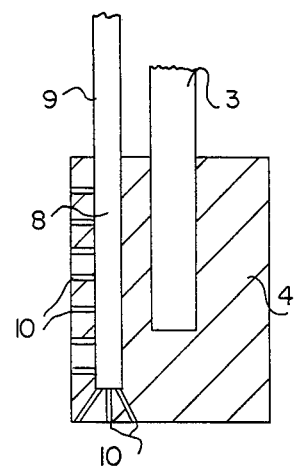
FIG. 2 is a cross-section on a larger scale of a guide rail, taken at the lubrication point.

The guide rail 4 shown top left in FIG. 1 is shown on a larger scale in FIG. 2. As can be seen more clearly from this Figure, there is provided at the lubrication point a channel 8 which extends in the guide rail transversely to the guide track and which is connected to a lubricant supply pipe 9. A plurality of bores 10 starting from this channel 8 carry the lubricant to the surface of the rail in the sliding region. Each of the guide rails 4 has at least one such lubrication point.

Figure 3:
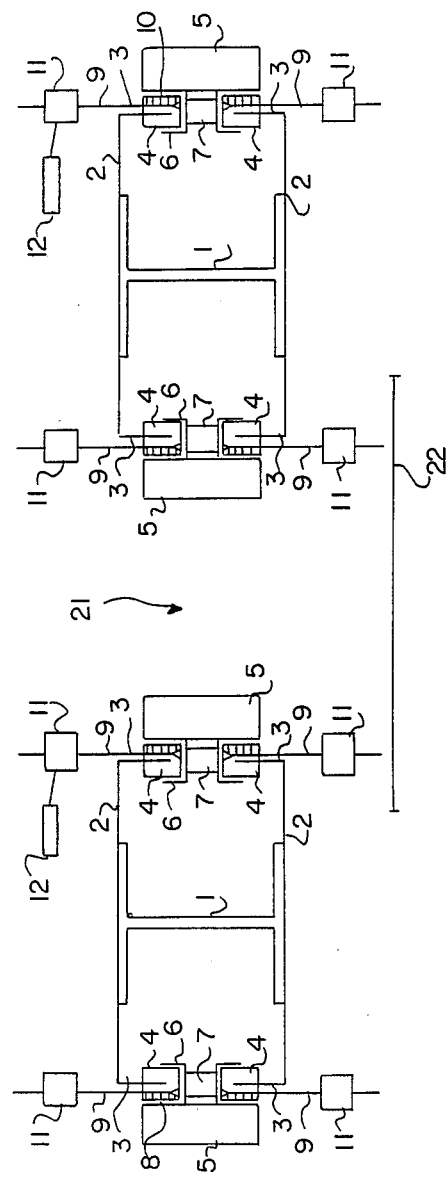
FIG. 3 shows a pair of the chain guides in a drag chain conveyor as illustrated in FIG. 1 in side by side relationship.

In FIG. 3 of the drawings, there is shown a pair of chain guides in a drag chain conveyor in a side by side relationship. The drag chain conveyors define between them a conveying channel 21, in which loose articles, for example bottles, are conveyed. The sides of the conveying channel 21 are bounded, at least in part, by carriers 5 both moving in the same direction. Thus, the carriers 5 in the drag chain conveyor shown on the left hand side of the FIG. 1 move anti-clockwise, while carriers 5 mounted on the drag chain conveyor shown on the right hand side of FIG. 3 will move in a clockwise direction. In this way, loose articles in the conveying channel 21 will be moved by the drag chain conveyors in a direction away from the viewer of FIG. 3. The drag chain conveyors are supported on a suitable base 22, which may also support the loose articles conveyed in the conveying channel 21.

At each lubrication point the lubricant supply pipe 9 is provided with a pressure-reducing valve 11, which is so adjusted that the lubricant flows out of the bores 10 practically under zero pressure difference over the ambient pressure. This valve may be metered to permit the intermittent supply of lubricant to the surface of the rail.

I claim:

1. A drag chain conveyor comprising:
   an endless conveyor chain having a plurality of spaced apart successive carriers thereon, each carrier having a holder portion;
   guide rails having at least two planar surfaces, each planar surface being non-planar with respect to the remaining planar surfaces, the guide rails slidably supporting the carrier by the holder portion thereof, the guide rails being intermittently covered and uncovered as the spaced apart carriers slide over the guide rails, each guide rail having a channel therein and a plurality of bores extending from the channel in at least two non-parallel directions to at least two of the planar surfaces of the guide rail through which lubricant is supplied to the surfaces of the guide rail;
   a lubricant supply connected to the channel by a pipe; and
   a pressure-reducing metering valve operatively connected with the lubricant supply, the valve being adjusted so that the lubricant flows out of the bores substantially under zero pressure difference over the ambient pressure.

2. A drag chain conveyor as claimed in claim 1 wherein the metering valve intermittently supplies lubricant to the channel.

3. A drag chain conveyor as claimed in claim 1 further comprising automatic control means for continuously monitoring the supply of lubricant.

4. A drag chain conveyor as claimed in claim 1 wherein the guide rail is rectangular in cross section and wherein the bores extend from the channel so as to carry lubricant to two or more surfaces of the guide rail.

5. A drag chain conveyor as claimed in claim 4 wherein at least four bores are provided, said four bores radiating from the channel in a horizontal, vertical, left inclined and right inclined direction, so as to provide lubrication to two sides of the guide rail.

* * * * *